United States Patent [19]

McCugh

[11] 3,959,073

[45] May 25, 1976

[54] REACTOR HOLD-DOWN ARRANGEMENT
[75] Inventor: Ralph McCugh, Whitehall, Pa.
[73] Assignee: The United States of America as represented by the United States Energy Research and Development Administration, Washington, D.C.
[22] Filed: June 6, 1973
[21] Appl. No.: 361,900

[52] U.S. Cl. .................................. 176/85; 176/84
[51] Int. Cl.² ........................................ G21C 5/08
[58] Field of Search .................... 72/101.2, 106 US; 204/154.2; 176/84, 85

[56] References Cited
UNITED STATES PATENTS

| 1,501,563 | 7/1924 | Lawrence | 72/106 |
|---|---|---|---|
| 2,223,400 | 12/1940 | Bigelow | 72/101.2 |
| 2,281,951 | 5/1942 | Schroeder | 72/101.2 |
| 2,389,622 | 11/1945 | Hensel | 72/101.2 |
| 2,410,338 | 10/1946 | Craine | 72/6 |
| 2,553,393 | 5/1951 | Weber | 72/101.2 |
| 2,580,034 | 12/1951 | Lyons | 72/106 |
| 2,622,433 | 12/1952 | Jones | 72/101.2 |
| 2,708,656 | 5/1955 | Fermi et al. | 204/193 |

OTHER PUBLICATIONS

Harwell, The British Atomic Energy Research Establishment (1946–1951) London pub. by Her Majesty's Stationary Office 1952, pp. 99–106.

Primary Examiner—Samuel W. Engle
Assistant Examiner—Peter A. Nelson
Attorney, Agent, or Firm—Dean E. Carlson; Arthur A. Churm

[57] ABSTRACT

A nuclear reactor contains an assembly of moderator blocks, laid end-to-end, one on top of another, and alongside one another, which blocks are restrained by vertical beams at each side of the assembly, fixed horizontal beams surrounding the assembly at the top and bottom and springs connecting the fixed horizontal beams and the ends of the vertical beams in such a way as to permit relatively high expansion midway of the height of the assembly while restricting expansion near the top of the assembly.

1 Claim, 6 Drawing Figures

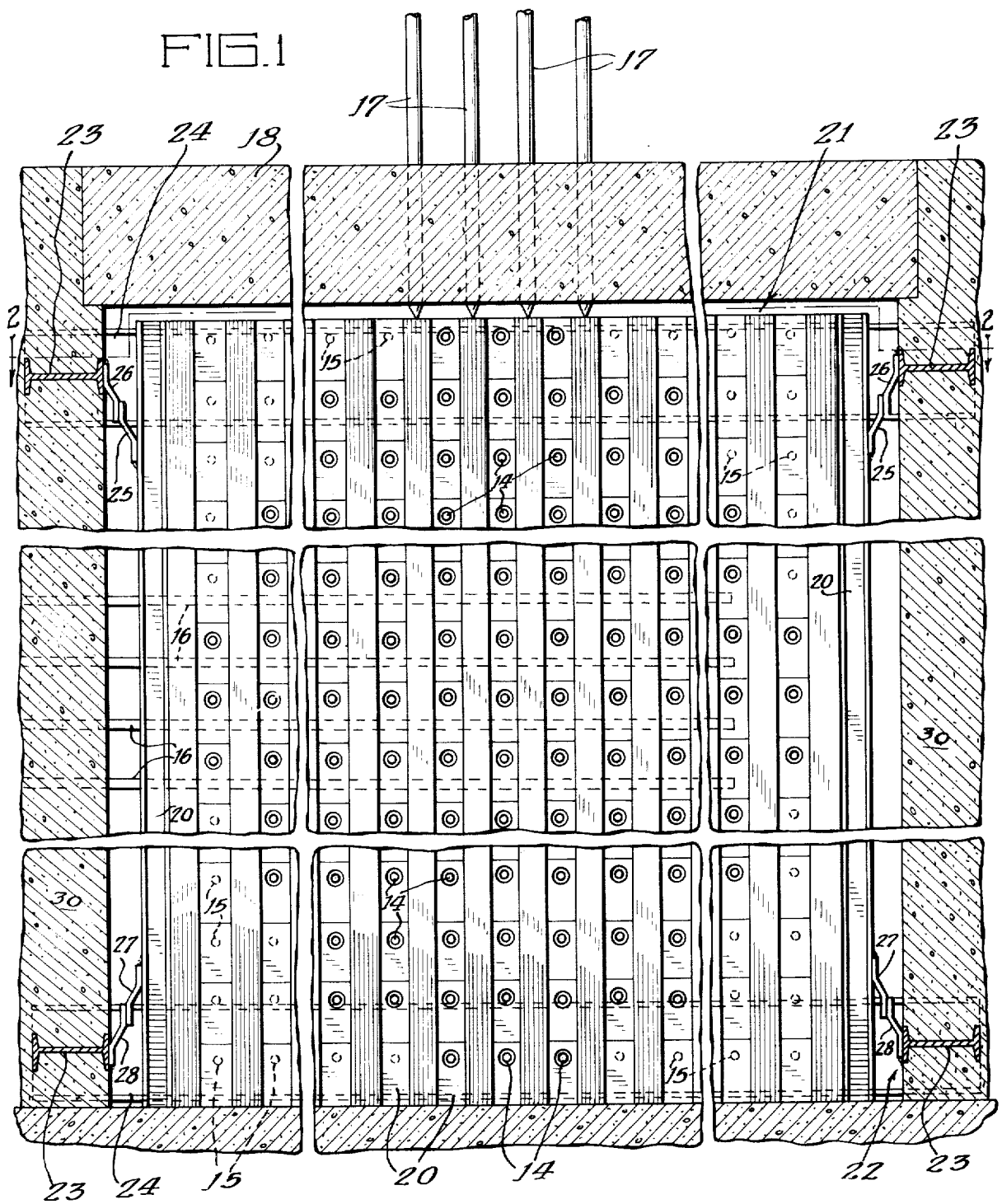

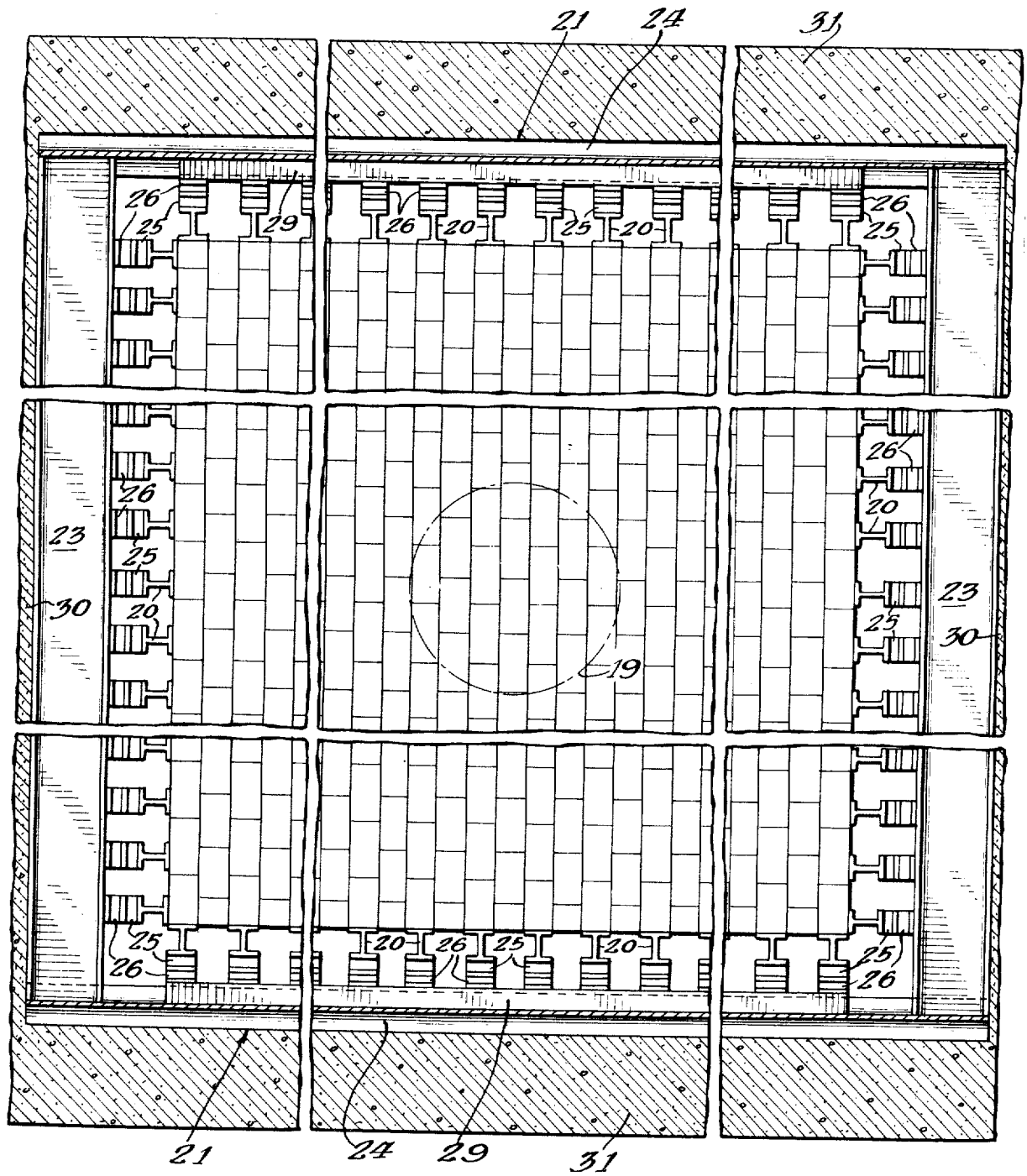

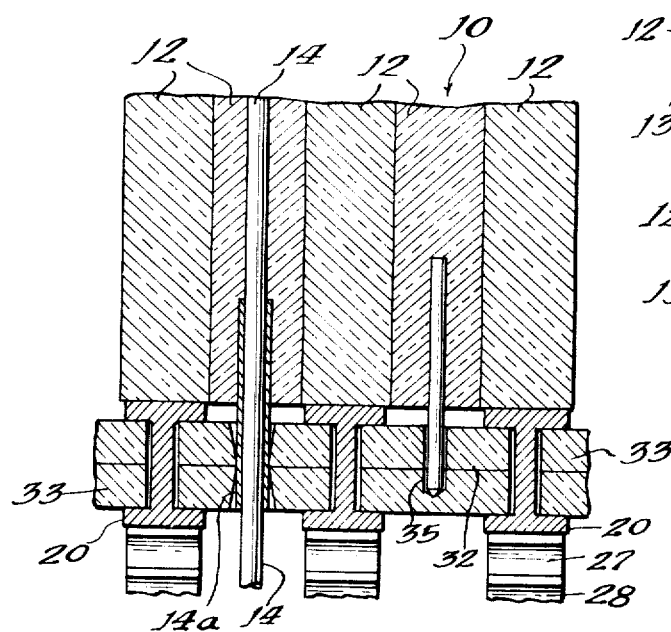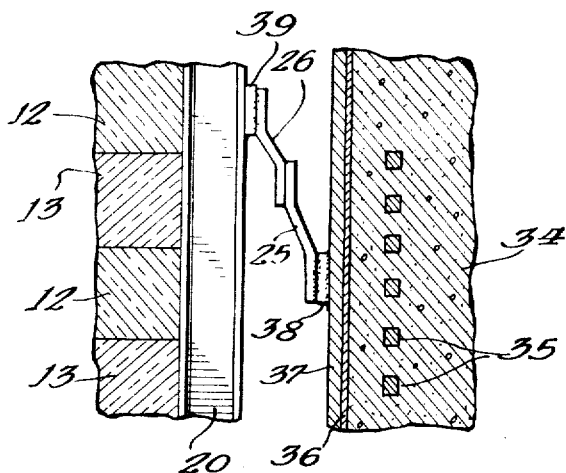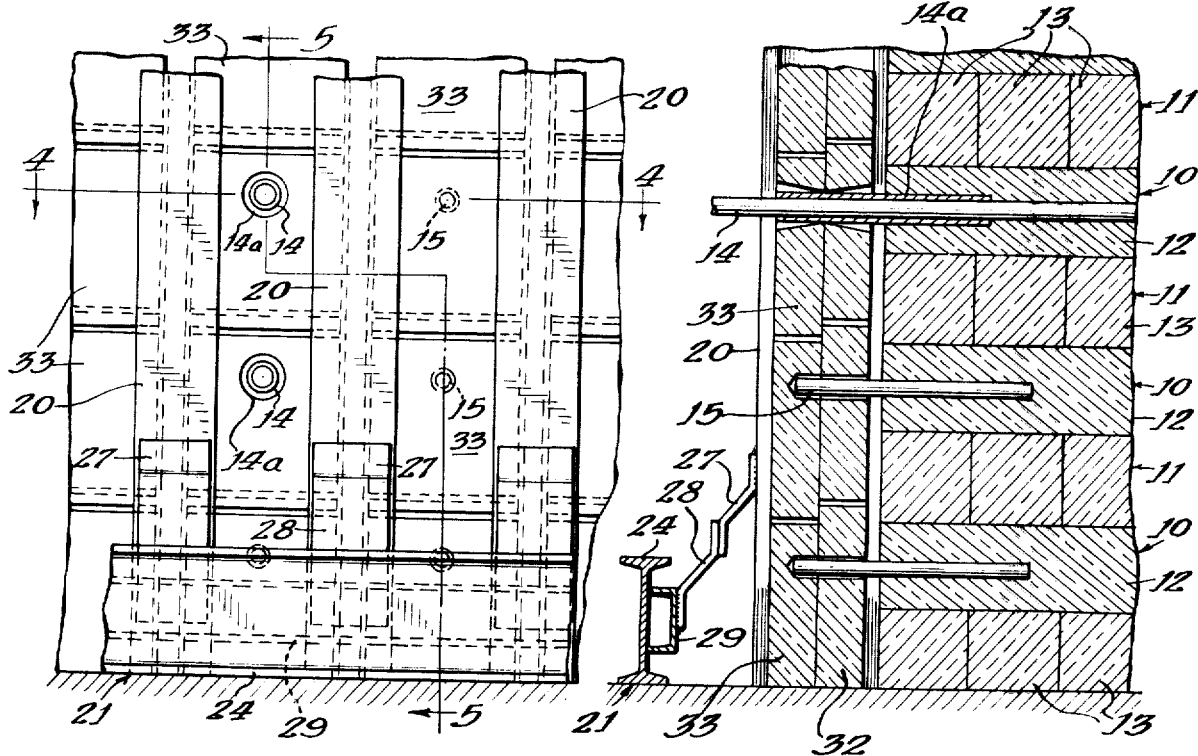

REACTOR HOLD-DOWN ARRANGEMENT

This invention relates to an improvement in a neutronic reactor and more particularly to an improvement in an arrangement for containing and holding the reactor to minimize the effects of growth in the moderator of the reactor.

Graphite has been used as a moderator since the development of the neutronic reactor, and its desirable characteristics are now well known in the art. Graphite expands when subjected to high neutron densities, and such expansion is more than to be expected merely from the high temperatures caused by the high neutron densities.

It is customary to construct the moderator in many horizontal layers one on top of the other, each layer being composed of rows of blocks laid side by side. The expansion of a layer of blocks midway between top and bottom will be appreciably larger than that of the top layer because the neutron flux in the center is greater. Yet the over-all width of the top layer may increase as much as that of a middle layer, since friction between layers will cause an expanding layer to carry along a higher layer.

It is customary to employ one or more vertical safety rods in such a way that they are held with their lower ends adjacent the top of the reactor, ready to be quickly lowered into the reactor through suitable vertical passageways formed in the blocks. Because of the displacement of the top blocks in accordance with the expansion of the blocks in a middle layer, the entrances to the passageways at the top of the pile may be sufficiently displaced to make insertion and lowering of the safety rods through the pile difficult. An important matter to be noted here is that the actual expansion of the upper layers is relatively small because of remoteness from the middle of the pile and thus itself will not appreciably interfere with insertion and lowering of the safety rods and that the relatively large expansion of the layers midway of the height of the pile should not be prevented.

An object of the present invention is to provide an improved holding and restraining means for a pile of the above type by which means the above phenomenon is taken into account and the top of the pile is held to its actual expansion to make feasible the application of vertical safety rods to the pile. With the present invention a greater holding effort is applied to the top of the pile than to the middle thereof.

A further object is to provide an improved shield for thermal neutrons in conjunction with the aforementioned holding and restraining means.

Other objects of the invention will become apparent from the following specification and the accompanying drawings in which:

FIG. 1 is a vertical sectional view taken through a neutronic reactor to which the holding and restraining means of the present invention is applied;

FIG. 2 is a horizontal sectional view taken on the line 2—2 of FIG. 1;

FIG. 3 is a fragmentary enlarged elevational view showing a small portion of what is shown in FIG. 1;

FIG. 4 is a horizontal sectional view taken on the line 4—4 of FIG. 3;

FIG. 5 is a vertical sectional view taken on the line 5—5 of FIG. 3; and

FIG. 6 is a vertical sectional view showing a modification.

A neutronic reactor to which the present invention is applied includes a graphite moderator that comprises a plurality of alternate horizontal layers 10 and a plurality of alternate horizontal layers 11 which lie between the layers 10. Each layer 10 is composed of rows of graphite blocks 12 extending in the same direction, and each layer 11 is composed of rows of graphite blocks 13 extending transversely to the rows of blocks 12. Alternate rows of blocks 12 in each layer 10 have longitudinal passages for coolant tubes 14, which may be formed of aluminum and are adapted to contain fuel elements that, because of appropriate shaping of the coolant tubes or the fuel elements, are spaced from the coolant tubes so that passages for fluid coolant are provided within the coolant tubes and around the fuel elements. The fuel elements may comprise jacketed bodies formed of natural uranium or other material containing a thermalneutron-fissionable isotope, such as $U^{235}$, $U^{233}$, and $Pu^{239}$, and jackets of material having a small neutron-capture cross section, such as aluminum. The fuel elements, being within the coolant tubes 14, are not shown. Sleeves 14a which may be of aluminum or iron are positioned in the rows of those blocks 12 that receive the coolant tubes 14 at one end of such blocks 12 so as to protrude therefrom and are adapted to facilitate introduction of the coolant tubes in the blocks. In the particular construction shown, the coolant tubes 14 are arranged in a square lattice, and the outline of the entire group of coolant tubes is generally round. Certain rows of blocks 12 beyond the group of coolant tubes receive rods 15 which protrude from the blocks 12. These rods may be formed of iron or steel, and their purpose will be described presently.

Horizontal control rods 16 constructed of material having high neutron-capture cross section, such as boron steel or cadmium, are slidably disposed within the moderator and may be withdrawn to increase the rate of neutronic chain reaction. The construction and requirements for neutronic reactors of the type generally described are well understood by the man skilled in the art and form per se no part of the present invention. The patent applications of Creutz et al., Ser. No. 574,153, filed Jan. 23, 1945, now U.S. Pat. No. 2,910,418, and Fermi et al., Ser. No. 568,904, filed Dec. 19, 1944, now U.S. Pat. No. 2,708,656, fully describe operative neutronic reactors of the type described above.

The neutronic reactor of the present application is also provided with a plurality of vertical safety rods 17 which are adapted to be positioned as viewed in FIG. 1 with their lower portions projecting through a top shield 18 and their lower ends adjacent the top of the moderator. The safety rods 17 occupy this position when the reactor is in operation and are moved quickly down through and into the moderator when the reactor is taken out of operation. The safety rods 17 should have a high neutron absorption and so may be of boron as disclosed in the copending Ohlinger application, Ser. No. 687,635, filed Aug. 1, 1946, now abandoned, or of a more complex construction varying from one end to the other end of the rods as disclosed in the copending Wende application, Ser. No. 308,768, filed Sept. 10, 1952. Tubes (not shown) may be provided in the moderator to receive the safety rods and should be formed of a material having low neutron-capture cross section, such as aluminum. The safety rods may be arranged so as to fall within a generally curved outline 19 indicated in FIG. 2. The important thing to note about the safety rods 17 is that they should be positioned directly above the moderator, completely withdrawn therefrom but capable of quick insertion thereinto.

It is a purpose of the present invention to provide physical control and restraint of the moderator such that the tubes or other passageways remain correctly positioned with respect to the withdrawn safety rods so that the rods can be quickly inserted into the passageways and projected through the moderator.

Graphite expands when subjected to high neutron densities, and such expansion is more than is to be expected merely from the high temperatures caused by the high neutron densities. Since the neutron density is higher at the center of the reactor, the expansion is higher midway between top and bottom than at the top and bottom. Now although the expansion of the graphite blocks at the top of the pile is relatively low, a spreading of the top blocks tends to occur which can make difficult the insertion of the safety rods 17 in the upper ends of the vertical passageways through the moderator. Such spreading of the top blocks is due to the fact that friction between the blocks causes blocks in a given layer to expand so that they carry along the blocks of the layer above. Thus although blocks above the middle of the moderator expand less than the blocks at the middle, such greater expansion is in effect transmitted to the higher blocks as spreading. As a result the spreading of the top blocks is determined by the high expansion of the middle blocks. It is unsatisfactory to confine rigidly the moderator from bottom to top, for the middle must be permitted to expand in order to avoid crushing the coolant tubes 14.

According to the present invention, restraining means are provided which permit the relatively high expansion in the middle of the pile while holding the top of the pile to limit its increase in size to that due to expansion of the top blocks by preventing spreading of the top blocks that would be caused by greater expansion of the blocks at the middle of the moderator. This restraining means will now be described.

Spaced vertical I-beams 20 are provided in engagement with the four sides of the moderator. As shown in FIG. 1, two restraining rings 21 and 22 are provided in surrounding relation to the top and bottom of the pile and are spaced from and outward of the I-beams 20. Each of rings 21 and 22 consists of two I-beams 23 at the sides of the moderator and two I-beams 24 at the ends of the moderator, i.e., at the faces into which the coolant tubes 14 extend. The I-beams 23 and 24 are joined to one another by suitable means such as welds and are horizontal. As shown in FIGS. 1 and 2, the flanges and webs of the beams 23 are vertical and horizontal, respectively, and the flanges and webs of the beams 24 are horizontal and vertical, respectively. Between each beam 20 and the adjacent beam 23 or 24 are placed a pair of spring elements 25 and 26 at the top of the moderator and a pair of spring elements 27 and 28 at the bottom of the moderator. Each spring element 25 is secured as by welding to an upper region of an I-beam 20 and extends upwardly therealong, then upwardly and outwardly therefrom, and then upwardly in parallelism to the I-beam 20. Each spring element 26 is secured as by welding to a flange on a beam 23 or indirectly to the web of a beam 24 in spaced relation thereto by means of a channel 29 and extends vertically downwardly, then downwardly and inwardly, and finally vertically downwardly in overlapping engagement with the portion of the spring element 25 which is vertical and spaced from the upper end of the I-beam 20. The spring elements 27 and 28 are similarly attached to and project out from the lower ends of the I-beams 20 and the lower I-beams 23 and 24, but extend downwardly and upwardly, respectively, rather than upwardly and downwardly, respectively, as do the spring elements 25 and 26. The restraining rings 21 and 22 are set in concrete walls 30 and 31, which provide protection for the operating personnel.

The portions of the I-beams 20 between the spring elements 25 and 27 are unsupported against outward movement. Now when the reactor is in use for an extended time and expands from exposure to high neutron density, the portion of the pile midway between the top and bottom tends to expand the most and is free to do so because the beams 20 are not supported between the spring elements 25 and 27. At the upper and lower ends of the moderator there is less tendency toward expansion, and the yielding action of the spring elements 25, 26 and the spring elements 27, 28 accommodates the limited expansion while resisting any tendency of the upper blocks to become spaced from one another due to being carried along with the lower blocks at the middle through friction. Thus there is a minimum of displacement of the passageways through the blocks for the safety rods 17, and in particular, the entrances of the passages are held as much as possible against any displacement whatsoever. The result is that entrance of the safety rods 17 into their passageways and movement through the passageways are facilitated, and the safety rods can be quickly lowered completely into the pile. Whatever vertical growth of the pile may take place is accommodated by the vertical portions of the spring elements 25 and 26 and of the spring elements 27 and 28 which are in overlapping engagement and can move vertically with respect to one another.

If desired, the arrangement for resisted expansion of the pile involving the spring elements 25, 26, 27, and 28 may be limited to the sides of the pile, that is, the surfaces that are parallel to the coolant tubes 14. The reason for this is that the expansion is most likely to occur in a direction transverse to the coolant tubes 14. Those blocks 12 through which the coolant tubes 14 extend will run cooler than the blocks 13 because of the coolant. Consequently, the growth due to high-neutron-density exposure will be greater in those blocks 12 than in the blocks 13. Since the blocks will normally be formed by extrusion in the direction of their length, and the aforementioned growth will occur transverse to the direction of extrusion, the blocks 12 will tend to grow transverse to their lengths or in a direction transverse to the sides of the pile. The blocks 13 extend transversely to the sides of the pile and so will grow transverse to the ends of the pile. The growth in blocks 13 is less than that in blocks 12 and may sometimes be ignored, and in that event the arrangement of spring elements 25, 26, 27, and 28 may be omitted at the ends of the pile.

At the ends of the pile shielding against the loss of thermal neutrons is provided by rows of relatively short thermal blocks 32 and 33 positioned between the flanges of adjacent I-beams 20. The blocks may be formed of iron and for the most part may be of the same length, but any two adjacent blocks 32 and 33 are vertically displaced from one another a small amount so that the joints between the blocks are staggered and thus better shielding is effected. Each pair of adjacent blocks 32 and 33 is mounted either on a coolant tube 14 which extends through both blocks or on a pin 15 which extends completely through the block 32 and only partially through the block 33. Since there are two relatively thin blocks 32 and 33 on each coolant tube 14 or the sleeve 14a rather than a single relatively thick block, the tendency of the blocks to bind on the coolant tube or the sleeve is reduced when the graphite blocks expand so as to move the beams 20 on one end face to the left as viewed in FIG. 5. As the pile expands vertically because of exposure to high neutron density, the individual short blocks 32 and 33 permit incidental change in the spacings between a vertical series of coolant tubes 14 to occur without binding them, since a given pair of blocks 32 and 33 receives only one coolant tube 14. The short lengths of the blocks 32 and 33 will prevent jamming of the blocks in the I-beams which might occur with greater length of blocks when the beams bend laterally as viewed in FIG. 1 with expansion transverse of the sides of the pile.

A similar arrangement of thermal blocks may be provided at the sides of the pile if desired, but may prove unnecessary, since only a few control rods enter through one side face, and the capacity for neutron absorption by the control rods 16 is completely different from that by the coolant tubes 14. If no thermal blocks or strips are provided between the I-beams 20 at the sides of the pile, suitable thermal shields not shown may be provided in the concrete walls. Such a construction is illustrated in FIG. 6. Here a concrete side wall 34 has embedded steel reinforcing rods 35 and is covered by a sheet 36 of boron and aluminum, which is in turn covered by a steel sheet 37. The spring elements 25 are secured to the steel sheet 37 through a spacer member 38. The spring elements 26 are secured to the I-beams 20 at the side face of the pile through a spacer member 39.

It will be understood that this invention is not to be limited to the details given herein but that it may be modified within the scope of the appended claims.

What is claimed is:

1. In combination with a neutronic reactor containing an assembly of moderator blocks laid end-to-end, one on top of another, and alongside one another, and having passageways for safety rods projecting through the moderator blocks, an apparatus for restraining said assembly of moderator blocks comprising vertical beams positioned at each side of said assembly, an upper and a lower set of fixed horizontal beams surrounding the vertical beams at the tops and bottoms respectively thereof, and partially yielding means acting between the fixed horizontal beams and the ends of the vertical beams, said partially yielding means comprising spring elements divided into four groups, the first group being fastened to the lower fixed horizontal beams and extending upwardly and inwardly toward the vertical beams, the second group being fastened to the lower ends of the vertical beams and extending outwardly toward the lower fixed horizontal beams and downwardly into sliding contact with the first group, the third group being fastened to the upper fixed horizontal beams and extending downwardly and inwardly toward the vertical beams and the fourth group being fastened to the upper ends of the vertical beams and extending outwardly toward the upper fixed horizontal beams and upwardly into sliding contact with the third group.

* * * * *